United States Patent [19]

Rudolf et al.

[11] 4,285,744

[45] Aug. 25, 1981

[54] PROCESS FOR THE REPRODUCTION OF OIL PAINTINGS OR SIMILARLY TEXTURED IMAGES

[76] Inventors: Emil Rudolf; Manfred Rudolf, both of Adelstetten 8, 8229 Ainring 1, Fed. Rep. of Germany

[21] Appl. No.: 97,415

[22] Filed: Nov. 26, 1980

[30] Foreign Application Priority Data

Nov. 30, 1978 [DE] Fed. Rep. of Germany ....... 2851875

[51] Int. Cl.[3] ........................ B29C 27/04; B44C 1/20; B44F 11/02

[52] U.S. Cl. ...................................... 156/59; 156/219; 156/273; 264/220; 264/246; 264/293; 264/320; 428/15; 428/161

[58] Field of Search ................. 156/273, 61, 219, 220, 156/59; 428/15, 161; 264/293, 27, 220, 246, 320

[56] References Cited

U.S. PATENT DOCUMENTS

| | | | |
|---|---|---|---|
| 3,468,736 | 9/1969 | Porter et al. | 156/273 |
| 3,705,071 | 12/1972 | Gras | 156/273 |
| 3,711,362 | 1/1973 | Ballard | 156/273 |
| 3,769,114 | 10/1973 | Weigert | 156/219 |
| 3,772,106 | 11/1973 | Giorgi | 156/59 |
| 3,856,592 | 12/1974 | Giorgi | 156/220 |
| 3,917,786 | 11/1975 | Weigert | 428/15 |
| 4,036,676 | 7/1977 | Pennington | 156/273 |
| 4,205,210 | 5/1980 | Salway-Waller et al. | 156/273 |

*Primary Examiner*—Michael G. Wityshyn
*Attorney, Agent, or Firm*—Orrin M. Haugen; Thomas J. Nikolai

[57] ABSTRACT

The invention concerns a process for the reproduction of oil paintings or similarly surface-textured images by use of a relief form transferred from an original and a smooth thermoplastic color photo film that is imprinted corresponding to the original, with the film, together with a reenforcing back ply, being laid onto the relief form in fitting alignment and with the film and reenforcing ply being deformed by heating to correspond to the surface texture of the original.

6 Claims, 1 Drawing Figure

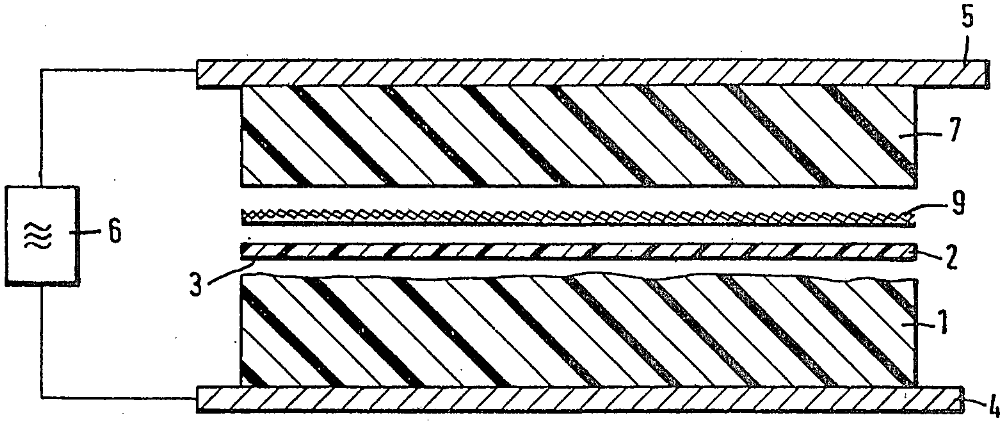
5
7
9
6
2
3
1
4

PROCESS FOR THE REPRODUCTION OF OIL PAINTINGS OR SIMILARLY TEXTURED IMAGES

BACKGROUND OF THE INVENTION

For reproduction, for example of oil paintings, copying offers a first choice. However, good copies require considerable expertise and a high expenditure of time so that they are expensive and, in quantity, cannot keep up with the demand of a rising cultural life. On the other hand, multicolor fine art printing, developed to a highly faithful reproduction in color and definition, does indeed yield valuable replicas. However, this is coupled with the disadvantage that the relief-like surface texture of the original is lacking which, in the case of an oil painting or a similar work of art, is also the means of expression of the artist and is even recognized as such by a lay person.

For the solution to this problem, as given in German Pat. specification No. 494 894, French patent No. 15 21 466, German printed specification 20 19 699 and German patent specification 2 352 966 were processes in which a transparent ply of gelatin and plastic, respectively, is placed on a multicolored print, faithful to the original, on the picture side. The transparent ply receives, through means of a form transferred from the original before or after placement, the relief configuration of the original surface. Actually imitated in this manner on the transparent ply is the relief-like surface configuration, however the resultant imitation does not give the same impression as in the case of the original since it is not formed by the paint as it is in the original. Thus the effect of the surface formed by the transparent ply is extraordinarily strongly dependent on the angle of observation, the lighting and the like.

These shortcomings are eliminated with processes in accordance with French Pat. No. 14 93 516 and French Pat. No. 15 48 337. These patents disclose a process for the reproduction of oil paintings or similarly surface-textured images by use of a relief form transferred from an original and a smooth thermoplastic color photo film that is imprinted corresponding to the original with the film together with a relief form being placed in fitting alignment and with the film thereafter being deformed by heating to correspond to the surface of the original. According to French Pat. No. 14 93 516, the relief form is provided with air passage holes. Then, laid over the relief form in fitting alignment is the color photo film, over which is placed a thick polystyrene foil. The thick polystyrene foil is heated to the softening temperature of the color photo film. Next, with a vacuum or negative pressure below the relief form and/or a superpressure above the polystyrene form, this latter is pressed together with the color photo film into the recesses of the relief form. In this fashion, after rehardening, the color photo film takes on the surface form of the original. The process in accordance with French Pat. No. 15 48 337 corresponds to this known process, with the exception that the color photo film is heated up by irradiation with infrared light instead of contact heating by means of a polystyrene foil, and forming is accomplished solely by vacuum below the relief form. Compared to the transparent relief surface plies obtained with the preceding described processes, the resulting color photo film relief surfaces represent an improvement. However, in the case of both processes, the force of heat acting upon the color photo film over a relatively long period of time, leads to a more or less strong change of the naturally temperature-sensitive printing inks. The reason for this lies in the fact that, principally, the polystyrene foil, but also the color photo film itself, (even though the latter is relatively thin) display a non-negligible heat capacity, thereby requiring some time until the heat transferred onto the unprinted side of the color photo film has brought the printed side to the required softening temperature. Accordingly, it takes some time before the compound picture of polystyrene foil and color photo film, which has an essentially greater heat capacity than the color photo film alone, is again cooled down to non-damaging temperatures.

The task set forth for the invention is to procure an improved procedure as compared to the state-of-the-art, wherein the actions of damaging high temperatures on the color photo film are essentially reduced. This is achieved by the process wherein the colored photo film, preferably polyvinyl chloride, capable of being dielectrically heated together with a reenforcing ply consisting of linen cloth-like webbing with a thin coating of a material capable of being dielectrically heated (preferably polyvinyl chloride) and capable of being welded to the colored photo film, wherein the coated reenforcing ply is laid on the back side of the color photo film and, during heating, the back side of the webbing portion of the reenforcing ply is acted upon by a pressure equalizing plate of closed-cell foam material which, like the relief form, consists of the material which is only negligibly heated dielectrically, such as silicone rubber.

Through means of the dielectric heating, the color photo film is simultaneously heated through its entire thickness and brought to the required softening temperature. Since only the thin coating and not the linen cloth-like webbing of the reenforcing ply is dielectrically heated, the compound picture, made up of the thin coating of the reenforcing ply and the color photo film, has a low heat capacity and, additionally, the webbing of the reenforcing ply that has remained cool takes on heat. Moreover, there results a still faster completion of the process and a greater output per unit of time. Also, a more precise metering of the heat being furnished is possible, both relative to intensity and to the actual period of duration.

In an advantageous form of embodiment of the process, the relief form utilized can, at least on its forming surfaces, be galvanically metal-plated or be structured completely of metal. In this fashion, trueness of form itself is guaranteed in the case of a high number of reproductions. Furthermore, a good and fast heat removal conduction results on the printed side of the color photo film.

The invention will be explained in more detail in the following with the aid of examples of embodiment, taking into account the drawing.

IN THE DRAWING

The drawing shows, in an exploded view, a schematic of one arrangement for carrying out the process.

Laid over a relief form 1, reproducing the surface configuration of an original oil painting, or e.g., alligator leather, is a color photo film 2 with the printed side 3 facing downward. Laid onto the color photo film 2 is a reenforcing ply 9 that consists of a linen cloth-like webbing and of a thin, dielectrically heatable coating on its side turned toward the color photo film 2, over which there is, in turn, a plane pressure equalizing plate 7 made of closed-cell foam material that is not so heatable.

Production of the relief form 1 is accomplished in accordance with known processes. For example, it is possible to produce from the original oil painting a soft-casting negative made of silicone rubber or of polyester resin. Printing of the color photo film 2 is accomplished, for example, by the offset process, where a color shot of the original oil painting is processed with extremely precise color values, without light reflections, into exact, faithfully dimensioned offset films in four or more colors. As is self-apparent, care is to be taken here to maintain exact dimensions. Both in the production of these offset films and in the production of the relief form 1, aligning marks can be provided right from the outset outside the picture field, which then facilitate alignment of the color photo film 2 relative to the relief form 1.

For carrying out the process, an electrode 4 arranged underneath the relief form 1 on one side, and an electrode 5 arranged above the pressure equalizing plate 7, are connected to a high frequency generator 6. The electrodes 4,5 are moved toward one another until a predetermined pressure is exerted over the pressure equalizing plate 7 along with the reenforcing ply 9, and over the color photo film 2 along with the relief form 1. By means of short periods of switched-on time of the high frequency generator 6, the color photo film and the coating of the reenforcing ply 9 are heated to their softening and/or welding temperature. The color photo film 2 deforms into the negatively structured forming surfaces of the relief form 1, while the reenforcing ply 9 is simultaneously welded with the unprinted side of the color photo film 2. In the event that the normal roughness of the original painting, and therewith of the forming surfaces of the relief form 1, should not suffice for leading off the air enclosed in the recesses under the foil, microscopically small air ducts can be formed, perpendicularly to the electrode 4, in the relief plate 1. Furthermore, the relief form 1 can also be structured microscopically porous so that the air can evacuate over the entire surface of the color photo film 2. Depending upon conditions, the electrode 5 can be structured such that a uniformly homogenous heating of film 2 over its entire thickness and its entire length is guaranteed. By suitable splitting of the electrode 5, however, a somewhat greater or somewhat earlier-starting heating can occur in the center of the surface of the color photo film 2 if an appropriately timed, sequential turn-on of the resulting partial electrodes is undertaken.

The color photo film 2 that is deformed and printed in accordance with the process yields a very exact reproduction of the original with the finest of texturing, so that the practically smooth-acting surface-forms, for example in the case of the painting technique of the 19th century, are also reproducible, faithful to the original. The character of authenticity is further accentuated by the rearwardly transparent webbing of the reenforcing ply 9.

EXAMPLE

A high frequency generator 6, with a power rating of 40 KW and a frequency of 27.12 MHz displays an electrode surface of $50\times50$ cm, where the electrodes 4,5 are to be pressed against one another with a force of 300 $KN/cm^2$. The color photo film 2 consists of 0.2 mm-thick PVC and is printed on one side in 8-color granolitho-plastic ink, without screening. The thickness of the pressure equalizing plate 7 amounts to 20 mm and corresponds approximately to that of the relief form 1. The material of the reenforcing ply 9 consist of linen cloth-like webbing made of nylon, with a coating of 0.1 mm-thick PVC. After stressing of the electrodes 4,5 HF-energy is fed in for 30 seconds. After shutdown and separation of the electrodes 4,5 one obtains a surface texture of color photo film 2 that is faithful to the original and a full-surface weldment with reenforcing ply 9. The thusly obtained imitation painting is nailed to a usual type wood frame. p The invention comprises a process, in particular for the reproduction of oil paintings, whereby one starts out from a dielectrically heatable color photo film, corresponding to the original, right up to the surface texture. This color photo film together with a reenforcing ply laid onto its back side, (the reenforcing ply being provided, on its side turned toward the color photo film, with a thin, dielectrically heatable coating) being arranged between two plate-shaped high frequency electrodes, with the picture side of the color photo film being covered over by a relief form not heatable dielectrically, and the back side of the reenforcing ply being covered by a plane pressure equalizing plate. The relief plate and the pressure equalizing plate consist of an elastic material which is not heatable dielectrically.

By mechanical stressing of the high frequency electrodes in addition to turning on the high frequency energy, the picture side of the color photo film receives the desired surface texture, while the reenforcing ply is simultaneously welded with the back side of the color photo film.

A short welding period results, through means of which the colors of the color photo film are protected. The impression of an authentic oil painting is precisely imitated by the webbing of the reenforcing ply.

We claim:

1. In a process for the reproduction of oil paintings or similarly surface-textured images by initially forming a relief form on the original, removing the relief form from the original, and forming a reenforced smooth thermoplastic color film imprinted in a manner corresponding to the original; wherein the reenforced film and relief form are aligned, and the film being thereafter deformed by heat until the surface texture of the film corresponds to the original through the use of the relief form, said process being characterized in that:

(a) said reenforced colored film consists of a material capable of being heated dielectrically at high frequency radiation and a reenforcement ply;

(b) said reenforcement ply consists of a woven webbing having a coating thereon, said coating being capable of being dielectrically heated by high frequency radiation and capable of being welded to the surface of said color film;

(c) said process being further characterized in that said reenforcing ply is placed on the back surface of said color film and subjected to high frequency radiation until heated dielectrically, and wherein the back surface of the reenforcing ply is exposed to a pressure equalizing plate fabricated from closed-cell foam synthetic resinous material which is substantially immune to dielectric heating.

2. The process as set forth in claim 1 being particularly characterized in that the surface of the relief form in contact with the color film is metallic.

3. The process as set forth in claims 1 or 2 being particularly characterized in that said pressure equalizing plate and relief form are disposed between a pair of opposed electrodes, and wherein each of said electrodes comprises plural segments, and wherein means are provided for periodically energizing each of said segments.

4. The process as set forth in claim 1 being particularly characterized in that said colored film consists of polyvinyl chloride.

5. The process as defined in claim 1 being particularly characterized in that said pressure equalizing plate consists of silicone rubber.

6. The process as set forth in claim 1 being particularly characterized in that said woven webbing is linen cloth.

* * * * *

UNITED STATES PATENT AND TRADEMARK OFFICE

CERTIFICATE OF CORRECTION

PATENT NO. : 4,285,744

DATED : August 25, 1981

INVENTOR(S) : Emil Rudolf and Manfred Rudolf

It is certified that error appears in the above-identified patent and that said Letters Patent are hereby corrected as shown below:

Item [22] Nov. 26, 1980 should read -- Nov. 26, 1979 --.

Signed and Sealed this

***Fifteenth* Day of *December 1981***

[SEAL]

*Attest:*

GERALD J. MOSSINGHOFF

*Attesting Officer* *Commissioner of Patents and Trademarks*